Patented July 27, 1943

2,325,207

UNITED STATES PATENT OFFICE 2,325,207

CATALYST AND PROCESS FOR THE HYDROGENATION OF POLYHYDROXY COMPOUNDS

Leonard A. Stengel and Walter K. O'Loughlin, Terre Haute, Ind., assignors to Commercial Solvents Corporation, Terre Haute, Ind., a corporation of Maryland No Drawing. Application May 13, 1940, Serial No. 334,890

3 Claims. (Cl. 260—635)

Our invention relates to a process for producing polyhydric alcohols and other valuable products from polyhydric alcohols of higher molecular weight, or from carbohydrates, by catalytic hydrogenation. More specifically, our invention relates to improved catalysts and to the use of these catalysts in a process of this type.

It has been known that sugars and polyhydric alcohols may be transformed to polyhydric alcohols of lower molecular weight or lower oxygen content by catalytic hydrogenation. In those cases which involve cleavage of a carbon-to-carbon bond in addition to hydrogenation, the process is termed "hydrogenolysis." In such a hydrogenation process, for example, sugars such as dextrose and sucrose may be transformed to mannitol, sorbitol, glycerol, propylene glycol and other products in varying proportions. Of the numerous catalysts which have been proposed for utilization in such a process, the undried precipitated copper hydroxide catalysts, when employed in an alkaline medium as described by one of us in copending application Serial No. 334,612, filed May 11, 1940, have been among the most successful, especially for the hydrogenation of crude carbohydrate materials such as molasses.

We have now discovered that the undried precipitated copper hydroxide catalysts referred to above may be substantially improved in their catalytic activity by incorporating with them, preferably by co-precipitation, undried precipitated hydroxides of magnesium or iron, or both. The resulting catalysts, initially comprising the mixed hydroxides, have increased catalytic activity for the hydrogenation of all types of polyhydric aliphatic compounds, but like the catalyst composed of copper hydroxide alone, they are particularly advantageous for the hydrogenation of crude carbohydrate materials such as molasses. Likewise, the modified catalysts resemble the catalyst composed solely of copper hydroxide in that they require alkaline conditions for satisfactory operation.

Our new catalysts initially comprise copper hydroxide together with a smaller amount of an hydroxide of magnesium or iron, or both. The term hydroxide as used in this connection, and in the appended claims, is to be construed as including not only the true hydroxide but also the various other hydrated forms of the oxide. Similarly, the terms copper hydroxide and iron hydroxide are to be construed as including the cuprous, cupric, ferric and ferrous oxides. We prefer to employ a catalyst initially comprising cupric hydroxide together with a smaller amount of ferric hydroxide or magnesium hydroxide, or both. However, there is some evidence that these initial hydroxides pass through other states before they have an opportunity to act as a catalyst in the process. Some dehydration apparently takes place, followed apparently by some reduction due to the presence of alkali and polyhydroxy compounds. The exact state of the copper and magnesium and iron compounds during the activity of the catalyst in the reaction is not definitely known, however, and our invention is not to be construed as limited to any particular theory in this respect. The essential element in our invention is the utilization in an alkaline reaction medium of mixed precipitated hydroxides of copper and magnesium or iron, which have not been allowed to dry following their precipitation and before incorporation into the reaction mixture, and which, preferably, have been co-precipitated in the reaction mixture itself.

If the catalyst is allowed to dry after precipitation and before utilization in the reaction, its catalytic activity is reduced to such an extent as to make it almost worthless from a commercial point of view. We have found that this diminishing of catalytic activity also takes place, but to a much less extent, if the wet precipitate is allowed to stand for a long period prior to utilization. For this reason it is undesirable to use a precipitate that has stood longer than a week, and we prefer to use freshly precipitated catalysts.

We have found that a very desirable process for providing freshly precipitated hydroxides of copper and magnesium or iron in the reaction mixture is to effect co-precipitation of the hydroxides in the reaction mixture itself. For example, if it is proposed to subject molasses in methanol solution to hydrogenation, an aqueous solution of copper sulfate containing lesser amounts of ferric sulfate and magnesium sulfate may be added to the molasses-methanol mixture, and caustic alkali may be added to precipitate the hydroxides directly in the reaction mixture. We prefer to employ this procedure since it avoids any possibility of deterioration of the catalyst following precipitation and before utilization in the process. However, it should be noted that this method involves the incorporation of additional substances in the reaction mixture, i. e., the alkali salts resulting from the action of the alkali on the copper, iron and magnesium salts. It will, of course, be apparent to those skilled in the art that in such a case substances should be chosen which will not produce salts which are poisonous to the catalyst or which may otherwise inhibit the hydrogenation reaction. For example, our catalysts, while not poisoned by the amount of chlorides normally present in molasses, may still be poisoned by an excess of chlorides, and for this reason it is preferable not to employ copper, iron or magnesium chlorides for the precipitation of the hydroxides. Similarly, nitrates are undesirable in a reaction mixture for hydrogenation of polyhydroxy compounds and their use should preferably be avoided. Copper sulfate, ferric sulfate, and magnesium sulfate are highly satisfactory in all respects, and in view of their low cost there is little need to attempt to use other salts for this purpose.

The amount of catalyst to be employed may vary over a considerable range, but in general, we prefer to use from 5-7 parts by weight, calculated as the hydroxides, per 100 parts by weight of the polyhydroxy compound to be subjected to hydrogenation. Smaller amounts of catalyst may be employed in some cases, and preliminary experiments will indicate the lower limit which may be employed without decreasing the yields. A considerable excess of catalyst generally has no undesirable effects, and here again it may readily be determined if an additional amount of catalyst is warranted by the increase in yield secured.

Similarly, the ratio of iron or magnesium hydroxides to copper hydroxide in the catalyst may vary over a considerable range. In general, however, we prefer to use from 5-15% by weight of iron or magnesium hydroxides based on the weight of the copper hydroxide. Smaller amounts of iron or magnesium hydroxides will exert a beneficial effect, but for optimum yields we prefer to use at least 5% by weight. Considerably higher proportions of magnesium or iron hydroxides may be used if desired, but if the copper content of the catalyst becomes too low, the catalytic activity will decrease, and the upper limit of magnesium or iron content which is practical when employing our catalysts is, therefore, the amount which shows no improvement in catalytic activity over a catalyst prepared solely from copper hydroxide.

For satisfactory operation of the process with our new catalysts, it is necessary to maintain alkaline conditions throughout the reaction. If the reaction mixture is allowed to become acidic prior to the conclusion of the reaction, the yields may be seriously decreased. Since acidic products may be formed from sugars or other polyhydric compounds during the course of the reaction, sufficient alkaline material should be provided to neutralize these acidic products and maintain an alkaline reaction at all times. We prefer, therefore, to provide sufficient alkali in the reaction mixture to maintain the pH above 7.0 throughout the entire reaction. This is most conveniently effected by introducing a large excess of alkali into the initial reaction mixture. The incorporation into the initial reaction mixture of 2-15 parts by weight of sodium hydroxide, or an equivalent amount of other alkali metal hydroxide, per 100 parts of polyhydroxy compound to be hydrogenated, in addition to the amount required to neutralize any initial acidity and the amount required to co-precipitate the hydroxides, will usually provide a suitable excess of alkali to maintain the desired alkaline conditions throughout the reaction. The degree of alkalinity required during the reaction when using our improved catalysts is essentially the same as that required for the copper hydroxide catalysts of U. S. Ser. No. 334,612, referred to above.

In employing our new catalysts the general procedures for carrying out this type of hydrogenation reaction which have previously been used may be suitably followed, provided alkaline conditions are maintained during the reaction as described above. The usual types of apparatus for this purpose may be used, as, for example, pressure autoclaves fitted with suitable agitating devices, or reaction vessels of the "rocking bomb" type described in "Reactions of Hydrogen," Homer Adkins, University of Wisconsin Press, 1937, chapter 3. It should be definitely understood that our invention is not limited to any particular type of apparatus or any particular mechanical details for carrying out the reaction.

The hydrogenation process in which our new catalysts may be employed consists essentially in dissolving or suspending the sugar or polyhydric alcohol in a suitable liquid medium, incorporating the undried precipitated hydroxides of copper and magnesium or iron in the resulting mixture, providing the necessary excess of alkali, and introducing hydrogen under super-atmospheric pressure while agitating and heating to the desired reaction temperature. The temperature may suitably be maintained constant throughout the reaction, or an initial reaction period at a lower temperature may be followed by a secondary reaction period at a higher temperature. The hydrogen pressure may suitably be maintained substantially constant by continuously or intermittently introducing hydrogen to replace that absorbed by the reaction. The agitation should be sufficient to maintain adequate contact of the reacting materials with the catalyst and to prevent local overheating of the polyhydroxy compounds, which might result in caramelization or charring.

The polyhydroxy compounds suitable for hydrogenation when using our catalysts constitute any of the polyhydroxy aliphatic compounds containing more than two hydroxy groups, such as the carbohydrates, and the polyhydric alcohols which contain three or more hydroxy groups. Among the carbohydrates which are particularly suitable for treatment in accordance with our invention are the simple mono- and disaccharides, particularly sucrose, invert sugar, glucose and fructose. Crude sources of such sugars may be employed, and high yields of the lower polyhydric alcohols may be obtained from such materials as high test molasses and crude corn sugar. Likewise, the higher polyhydric alcohols such as mannitol and sorbitol may be transformed to polyhydric alcohols of lower molecular weight. Our new catalysts are especially advantageous for the hydrogenation of the crude carbohydrate materials, and particularly high test molasses.

The liquid medium in which the reaction is effected may be chosen in accordance with prior practices in this regard, the mono- and dihydric alcohols being particularly suitable. As examples of suitable solvents for this purpose there may be mentioned methanol, propylene glycol, and 2-ethyl-1-hexanol. Water alone may be employed as the medium in which the reaction is to be effected, but we prefer to employ an aqueous alcoholic medium such as aqueous methanol. A very suitable medium constitutes approximately three parts by volume of methanol and one part by volume water. However, the use of our catalysts is not limited to any particular type of medium and any of the prior practices in this regard may be successfully followed.

A wide range of hydrogen pressure may be utilized when carrying out our process, without substantially affecting the reaction. The optimum pressure in any given case may depend to some extent upon the nature of the material being reacted, and the solubility of hydrogen in the reaction medium. The effective pressure will, of course, constitute the partial pressure of hydrogen in the mixture of hydrogen and vapors of the liquid medium used for the reaction. However, it is generally sufficient to consider the total pressure maintained in the reaction vessel, and we have found that this pressure should preferably be substantially above 1000 lbs. per sq. in., and suitably from 1500–2000 lbs. per sq. in. If the reaction vessel is adjusted to such pressure before heating, an increased pressure will result during heating and prior to hydrogen absorption, after which the pressure may again be adjusted either continuously or intermittently, to the initial value. Pressures above 2000 lbs. may be employed if desired, but satisfactory results are obtainable within the range 1500–2000 lbs. per sq. in.

The temperature and time of reaction to be employed in our process depend primarily on the ratio of products desired. In general, higher temperatures favor the production of lower molecular weight products, whereas lower temperatures favor the production of higher molecular weight products. For the production of propylene glycol as the major product, we prefer to carry out the reaction at a temperature of 210° C.–250° C. and more desirably at 230–240° C. At this temperature range, a considerable amount of glycerol will be formed in addition to the propylene glycol, together with a certain proportion of higher molecular weight polyhydric alcohols. When operating at lower temperatures, e. g., 150° C.–210° C., the major products will constitute the higher alcohol such as sorbitol and mannitol, together with some glycerol and other polyhydric alcohols of intermediate molecular weight, and smaller amounts of propylene glycol. The reaction time for optimum yields will in general vary inversely with the temperature. However, the reaction mixture may be maintained at the reaction temperature for considerably shorter or longer periods than the time for optimum yield without reducing the yield to a value below practical utility. In general, we prefer to maintain the reaction mixture at 230° C.–240° C. for from 3–4 hours with proportionately longer or shorter periods at higher or lower temperatures.

Our invention may be further illustrated by the following specific examples:

Example I

A reaction mixture was prepared containing 100 parts by weight of anhydrous dextrose and approximately 180 parts by weight of methanol. Into this mixture there was introduced approximately 12.0 parts by weight of copper sulfate (CuSO$_4$.5H$_2$O) in the form of a 25% aqueous solution, and approximately 8.8 parts by weight of sodium hydroxide in the form of a 30% aqueous solution. The resulting mixture was placed in a reaction vessel of the Adkins rocking bomb type, the air in the vessel was displaced by hydrogen and hydrogen was introduced at a pressure of 1700 lbs. per sq. in. The temperature was then raised while agitating the bomb to 230° C. and was maintained at that point for 3 hours with continued agitation. During this time hydrogen was introduced intermittently to replace that adsorbed in the reaction, maintaining the pressure in the vessel at approximately 1700 lbs. per sq. in. At the conclusion of the reaction, the bomb was cooled in a current of cold air, the hydrogen pressure released, and the product removed and analyzed for propylene glycol. No analysis was made for higher alcohols.

The above procedure was repeated with the exception that in one case approximately 2.4 parts by weight of magnesium sulfate (MgSO$_4$.7H$_2$O)

was added to the copper sulfate solution and in another case approximately 1.2 parts by weight of magnesium sulfate (MgSO$_4$.7H$_2$O) and approximately 1.2 parts by weight of ferric sulfate (Fe$_2$(SO$_4$)$_3$) were added to the copper sulfate solution. The following results were obtained:

| Catalyst | Yield of propylene glycol based on original sugar |
|---|---|
| | Per cent |
| Cupric oxide | 43.3 |
| Cupric oxide+magnesium oxide | 47.5 |
| Cupric oxide+magnesium oxide+ferric oxide | 48.7 |

Example II

A reaction mixture was prepared containing 100 parts by weight (dry basis) of high test molasses and 143 parts by weight of methanol. Into this mixture there was introduced approximately 12.1 parts by weight of copper sulfate (CuSO$_4$.5H$_2$O)

in the form of a 25% aqueous solution, and approximately 9.2 parts by weight of sodium hydroxide in the form of a 30% aqueous solution. The resulting mixture was subjected to hydrogenation in accordance with the procedure of Example I with the exception that the temperature was maintained at 150° C. for 1 hour, followed by 2 hours at 250° C.

This procedure was repeated with the exception that in one case approximately 2.4 parts by weight of ferric sulfate (FeSO$_4$) was added to the copper sulfate solution; and in a second case approximately 1.2 parts by weight of ferric sulfate (FeSO$_4$) and approximately 1.2 parts by weight of magnesium sulfate (MgSO$_4$.7H$_2$O) were added to the solution of copper sulfate. The following results were obtained:

| Catalyst | Yield of propylene glycol based on original sugar |
|---|---|
| | Per cent |
| Cupric oxide | 47.3 |
| Cupric oxide+ferric oxide | 50.2 |
| Cupric oxide+ferric oxide+magnesium oxide | 53.6 |

It is to be understood, of course, that the above examples are illustrative only and do not limit the scope of our invention. Other equivalent methods may be employed to obtain mixed precipitated hydroxides of copper and magnesium or iron for use as catalysts if care is taken to prevent drying or undue ageing of the oxides after precipitation. Similarly, other alkaline materials may be employed to provide the necessary alkaline condition of the reaction mixture throughout the reaction, and the reaction conditions and mechanical details of effecting the reaction may be varied within wide limits as previously pointed out. In general, it may be said that the use of any equivalents or modifications of procedure which would naturally occur to one skilled in the art, is included within the scope of our invention.

Our invention now having been described, what we claim is:

1. In a process in which a saccharide-containing material is admixed with a liquid medium and subjected to hydrogenation, the steps which comprise coprecipitating copper hydroxide and at least one member selected from the group consisting of ferric hydroxide and magnesium hydroxide in said mixture of saccharide-containing material and liquid medium, and effecting the hydrogenation in the presence of the resulting precipitate while maintaining the reaction mixture in an alkaline condition throughout the reaction.

2. In a process in which a solution of high-test molasses and methanol is subjected to hydrogenation, the steps which comprise coprecipitating cupric hydroxide and at least one member selected from the group consisting of magnesium hydroxide and ferric hydroxide in said solution of molasses, and effecting the hydrogenation in the presence of the resulting coprecipitate while maintaining the pH of the reaction mixture above 7.0 throughout the reaction.

3. In a process in which a solution of high-test molasses and methanol is subjected to hydrogenation, the steps which comprise introducing into said solution of molasses, an aqueous solution of copper sulfate and at least one member of the group consisting of ferric sulfate and magnesium sulfate, and a sufficient amount of alkali to precipitate said sulfates as hydroxides, and to provide excess free alkali equivalent to 2 to 15 parts by weight of sodium hydroxide per 100 parts by weight of sugar in said molasses, and effecting the hydrogenation in the presence of the resulting precipitate.

LEONARD A. STENGEL.
WALTER K. O'LOUGHLIN.